(12) United States Patent
Boinais et al.

(10) Patent No.: US 8,316,785 B2
(45) Date of Patent: Nov. 27, 2012

(54) FLAT SEAM CONSTRUCTION FOR AUTOMOTIVE UPHOLSTERY

(75) Inventors: Olivier Boinais, West Bloomfield, MI (US); Yelena Gonopolskaya, Rochester Hills, MI (US); Lola Lafferty, Capac, MI (US); Leonardo L. Gomes, Clawson, MI (US); Etienne Poulet, Saint Bresson (FR)

(73) Assignee: Faurecia Automotive Seating, LLC, Troy, MI (US)

( * ) Notice: Subject to any disclaimer, the term of this patent is extended or adjusted under 35 U.S.C. 154(b) by 319 days.

(21) Appl. No.: 12/719,333

(22) Filed: Mar. 8, 2010

(65) Prior Publication Data

US 2011/0030596 A1 Feb. 10, 2011

Related U.S. Application Data

(63) Continuation-in-part of application No. 12/535,995, filed on Aug. 5, 2009, now Pat. No. 8,100,070.

(51) Int. Cl.
*D05B 1/10* (2006.01)
*D05B 1/00* (2006.01)

(52) U.S. Cl. ........ 112/166; 112/441; 112/436; 112/197; 112/470.27

(58) Field of Classification Search .................. 112/402, 112/436, 197, 475.08, 475.17, 162–167, 112/441, 470.27
See application file for complete search history.

(56) References Cited

U.S. PATENT DOCUMENTS

| | | | | |
|---|---|---|---|---|
| 1,855,254 A * | 4/1932 | Moffatt | ........................ | 112/100 |
| 1,934,328 A * | 11/1933 | Rubel | ........................ | 112/435 |
| 2,056,580 A * | 10/1936 | Le Vesconte | .................. | 112/435 |
| 3,776,157 A * | 12/1973 | Szostak | ........................ | 112/162 |
| 3,882,806 A * | 5/1975 | Marforio | ........................ | 112/243 |
| 5,236,243 A | 8/1993 | Reyes | | |
| 5,544,604 A * | 8/1996 | Winter | ..................... | 112/475.17 |
| 5,772,545 A | 6/1998 | Ou | | |
| 5,873,318 A | 2/1999 | Bohlinger et al. | | |
| 6,401,643 B2 | 6/2002 | Iida | | |
| 6,845,725 B2 | 1/2005 | Takei et al. | | |
| 6,962,120 B1 | 11/2005 | Fujikura et al. | | |
| 8,100,070 B2 | 1/2012 | Boinais et al. | | |
| 2002/0101110 A1 | 8/2002 | Mosquera | | |

FOREIGN PATENT DOCUMENTS

| | | |
|---|---|---|
| DE | 10247343 | 5/2003 |
| FR | 2809942 | 12/2001 |
| JP | 10035393 | 2/1998 |

OTHER PUBLICATIONS

International Search Report dated Nov. 24, 2010, for European Application EP10007841.

* cited by examiner

*Primary Examiner* — Ismael Izaguirre
(74) *Attorney, Agent, or Firm* — Reising Ethington P.C.

(57) ABSTRACT

A flat seam construction made up of a number of sequentially formed stitches and formed on a portion of one or more stitchable materials is disclosed. Each stitch has two outer threads, formed into first and second outer thread loops, and at least one inner thread, formed into at least one inner thread loop. Each of the inner and outer thread loops transversely penetrate the one or more stitchable materials. Each of the inner and outer thread loops have a bight portion engaging a bottom surface of the one or more stitchable materials. At least one looper thread is formed on the bottom surface, and arranged such that, the at least one looper thread passes between the bottom surface and at least one of the bight portions. At least one decorative thread is visible on a top surface of the seam construction.

21 Claims, 8 Drawing Sheets

FLAT SEAM CONSTRUCTION FOR AUTOMOTIVE UPHOLSTERY

This is a continuation-in-part of U.S. application Ser. No. 12/535,995, filed Aug. 5, 2009, and entitled "FLAT SEAM CONSTRUCTION," which prior application is hereby incorporated by reference in its entirety.

FIELD OF THE INVENTION

The present invention relates to the field of automotive upholstery, and more specifically, to a flat seam construction for use in joining portions of materials used in automotive upholstery applications, such as vehicle seat coverings, door panels, consoles, armrests, sun visors, headrests, instrument panels and the like.

BACKGROUND OF THE INVENTION

Automotive upholstery applications, excluding seating applications, very often employ a soft, relatively thin textile or leather cover positioned over a substrate material constructed from a less flexible material, such as metal, plastic, foam, or the like. Automotive seating applications, being a specialized subset of automotive upholstery applications, typically comprise an inner substrate constructed from a resilient foam material overlain by the aforesaid soft cover. In either automotive upholstery application, the soft cover is usually formed from a number of parts stitched to each other by seams along join lines. In automotive seating applications, the threads of the seams are often adapted to attach to portions of the foam substrate material below, thereby holding the cover in a fixed position with respect to the foam substrate material. In non-seating applications, the soft cover may be attached by other more conventional attachment means, such as, for example, adhesives, clips, staples and the like.

Figure 1:
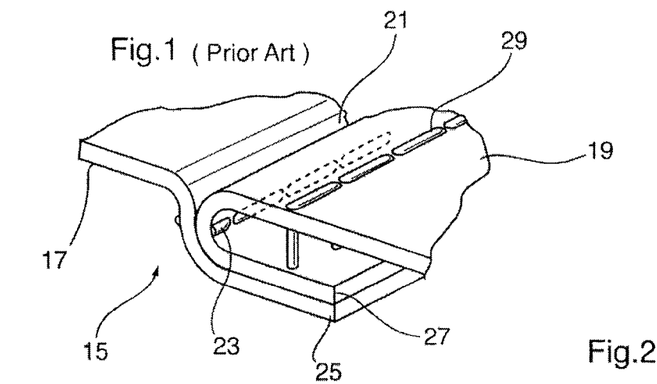
FIG. 1 is a perspective view of a prior art Deck seam construction.

The seam construction on automotive upholstery arrangements is typically carried out using either a Deck seam construction, or a French seam construction. An example of a Deck seam construction 15 is shown in FIG. 1. As shown therein, adjacent cover parts 17 and 19 are aligned along an edge 21 of each cover part, and placed with the outer surfaces of each cover part in mutual abutting contact. An overlapping margin region is thereby defined, and a first stitch line 23 applied, generally spaced from, and extending generally parallel to the aligned edge. This arrangement creates two seam flaps 25 and 27 which are then folded underneath one of the cover parts 19, and a second stitch line 29 is applied with the overlapping margin region and transverse to a top surface of the cover parts, to affix the seam flaps 25 and 27 underneath one of the cover parts 19. Thus, a two-part seam creation process is required, wherein the first stitch line 23 joins two adjacent cover parts 17 and 19, and a subsequently applied stitch line 29 adjoins the seam flaps 25 and 27 underneath one of the cover parts 19, providing a decorative finish to the seam construction.

Figure 2:
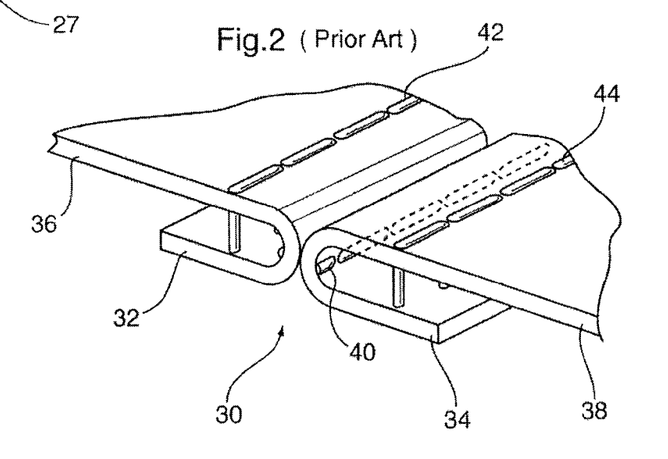
FIG. 2 is a perspective view of a prior art French seam construction.

An example of a French seam construction 30 is shown in FIG. 2. As seen therein, a French seam construction 30 is similar to the Deck seam construction 15, except that respective seam flaps 32 and 34 are folded underneath corresponding cover parts 36 and 38 (i.e., the flaps are folded in opposite directions). A first stitch line 40 is used to join the cover parts 35 and 38. Second 42 and third 44 stitch lines are subsequently applied to affix the respective seam flaps 32 and 34 to the corresponding cover parts 36 and 38. Thus, there is one join stitch line 40 and two decorative stitch lines 42 and 44 adjoining the folded over seam flaps 32 and 34 of each cover part 36 and 38 to a bottom surface of the respective cover part 36 or 38.

Both the Deck, and French seam constructions require two separate and distinct operations to complete the seam. That is, in the first operation, join stitching is applied to join the adjacent cover portions, and in a subsequent operation, a decorative stitching is applied to fix the underlying seam flap to one, or both of the cover parts. The decorative stitching may be applied in a pattern, or with a coloured thread, which provides for a finished look to the seam construction.

Both the Deck, and French seam constructions typically have excess material (known as "salvage") positioned on the underside of the cover material, which salvage is necessary to allow for proper stitching at the seams. This being the case, in order to ensure that a French or Deck seam lies flat and uniform across the upper surface of the cover, a ditch must be formed in the underlying rigid substrate material on which the upholstery cover is being applied to accommodate the thickness of the salvage material. In other words, such a ditch must be formed in the substrate material to ensure that the Deck or French seam remains flush with the remainder of the upholstery cover. This adds to the cost and complexity of producing a covered upholstery trim piece of the type discussed above. Moreover, this is particularly problematic where both an uncovered and a covered upholstery trim option are offered by a vehicle manufacturer to its customers, as both types of substrate materials (i.e. with a ditch and without) must be readily available in the production inventory of parts.

There is thus a need in the art for an automotive upholstery seam construction which can be applied in a single operation, and without the need for manipulating portions of the cover parts, such as by folding or otherwise rotating the cover parts. There is also a need in the art for a seam construction which does not require further manipulation of substrate materials to accommodate laying flat of the seam construction over the substrate material. There is a further need in the art for a seam construction which produces less waste material (i.e., salvage), as is created by the need for one or more seam flaps as required to form a Deck or French seam. Additionally, there is a need in the art for a seam construction that utilizes a multiple needle interacted process, thereby reducing the number of operations necessary to form the join seam and decoration seam.

In attaching the upholstery cover to a foam substrate material, such as in automotive seating applications, a fixing element is sometimes formed with, or formed to interact with, the seam construction, and thereby prevents the upholstery cover from shifting with respect to the substrate material. One such construction and fixing element is described in U.S. Pat. No. 6,561,581 issued on May 13, 2003 to Michot et al. FIGS. 5 to 7 of Michot et al. show a hook device arranged on a tape, which is secured to the foam substrate material at a position arranged to coincide with the seam construction of the seat cover. The hook device has a lobed end which engages the stitching of the seam construction and thus prevents relative movement between the seat cover and the foam substrate material. In forming the stitching of the Deck seam construction, additional stitch lines are provided on the seam flap, having a loop portion which can be adapted to engage the hook device.

There is also a need in the art for a simplified seam construction, which can have integrated therewith a fixing element for interaction with an underlying substrate material, such as in automotive seating applications, or which can interact with a fixing element positioned on the foam substrate material.

There is a further need in the art for a seam construction which can be applied easily and in a single operation to join adjacent cover parts and any additional elements to be integrated with the seam, such as those used for decoration, or for engaging with the substrate material.

SUMMARY OF THE INVENTION

In accordance a first embodiment of the present invention there is disclosed a flat seam construction formed on a portion of one or more stitchable automotive upholstery materials, said seam construction having a number of sequentially formed stitches, each stitch comprising two outer threads, formed into first and second outer thread loops, and at least one inner thread, formed into at least one inner thread loop. Said first and second thread loops are spaced across a width of said seam construction, and said at least one inner thread loop is positioned between said first and second outer thread loops. Each of said inner and outer thread loops transversely penetrates said one or more stitchable materials. Each of said inner and outer thread loops has a bight portion engaging a bottom surface of said one or more stitchable materials. At least one looper thread is formed on, and coplanar with said bottom surface, and arranged such that, said at least one looper thread passes between said bottom surface and at least one of said bight portions. At least one decorative thread is visible on a top surface of said portion of said one or more stitchable materials and extends across said width; wherein said at least one decorative thread loops around at least said first outer thread loop at a penetration point thereof.

In accordance with an aspect of the first embodiment, said one or more stitchable materials comprises a first stitchable material having a portion thereof overlapping a second stitchable material; said portion thereof defining a joining region for receiving said number of sequentially formed stitches to join said first stitchable material and said second stitchable material.

In accordance with another aspect of the first embodiment, said one or more inner threads comprises two inner threads, and said one or more inner thread loops comprises two inner thread loops.

In accordance with a further aspect of the first embodiment, said at least one looper thread comprises four looper threads, each passing through said bight portion of a respective one of said inner and outer thread loops.

In accordance with a further aspect of the first embodiment, said decorative thread loops around said first outer loop at said penetration point thereof, extends laterally across said width and loops around said second outer loop at a second penetration point thereof.

In accordance with a further aspect of the first embodiment, said decorative thread extends diagonally from said second outer loop at said second penetration point thereof to loop around a subsequent first outer loop of a subsequent stitch, extends laterally across said width and loops around a subsequent second outer loop of a subsequent stitch, thereby forming a serpentine pattern along a length of said flat seam construction.

In accordance with a second embodiment of the present invention, said at least one decorative thread comprises first and second decorative threads, wherein said first decorative thread loops around said first outer loop at said penetration point thereof, and extends diagonally to loop around a second outer loop of a subsequent stitch at a penetration point thereof; and said second decorative thread loops around said second outer loop at a penetration point thereof, and extends diagonally to loop around a first outer loop of a subsequent stitch at a penetration point thereof.

In accordance with a third embodiment of the present invention, there is provided at least one decorative element positioned on said joining region and secured thereto by said sequentially formed stitches.

In accordance with an aspect of the third embodiment, said decorative element is one of a tape and a ribbon.

In accordance with another aspect of the third embodiment, said decorative element is positioned on a top surface of said joining region.

In accordance with an aspect of the present invention, said one or more stitchable materials are automotive seat cover materials.

In accordance with a fourth embodiment of the present invention, one or more fixing elements are positioned on a bottom surface of said one or more stitchable materials, and adapted to interact with a foam material covered by said one or more automotive seat cover materials, and secured thereto by said sequentially formed stitches.

In accordance with an aspect of the fourth embodiment, said one or more fixing elements is selected from the group comprising one or more tie-downs, the hook portion of a hook and loop fastener, and the loop portion of a hook and loop fastener.

In accordance with another aspect of the present invention, said inner and outer threads are substantially evenly spaced across said width and substantially parallel to each other.

In accordance with a further aspect of the present invention, said sequentially formed stitches extend along a length of said joining region, said at least one decorative thread is arranged in a serpentine pattern along said length of said joining region, and said at least one looper thread extends along said length in a path such that said at least one looper thread passes between said bottom surface and each of said bight portions.

In accordance with a further aspect of the fourth embodiment, said one or more fixing elements comprises a hook element formed integrally with said one or more looper threads, said hook element arranged to engage a tie-down stud element extending from said foam material.

It is thus an object of this invention to obviate or mitigate at least one of the above mentioned disadvantages of the prior art.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 3:
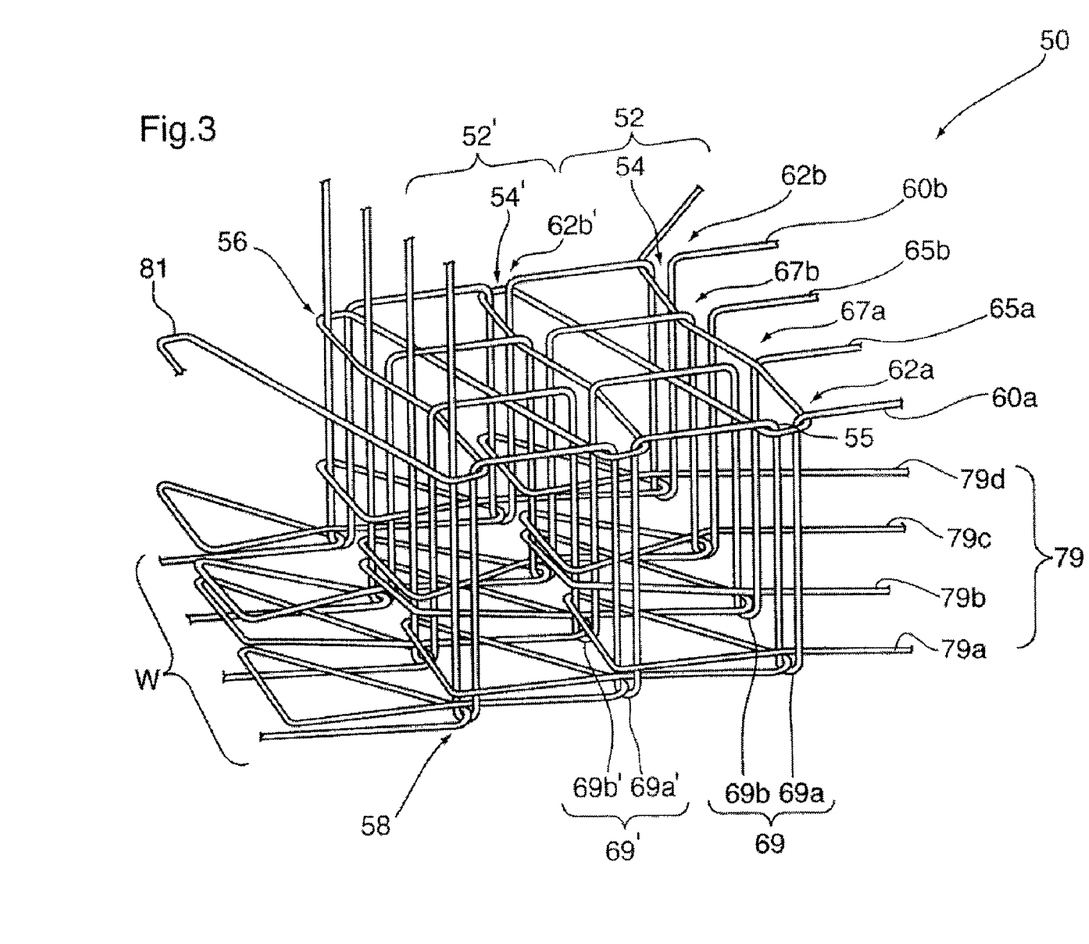
FIG. 3 is a schematic perspective view of a flat seam construction according to one embodiment of the present invention.
Figures 6, 7, 8:
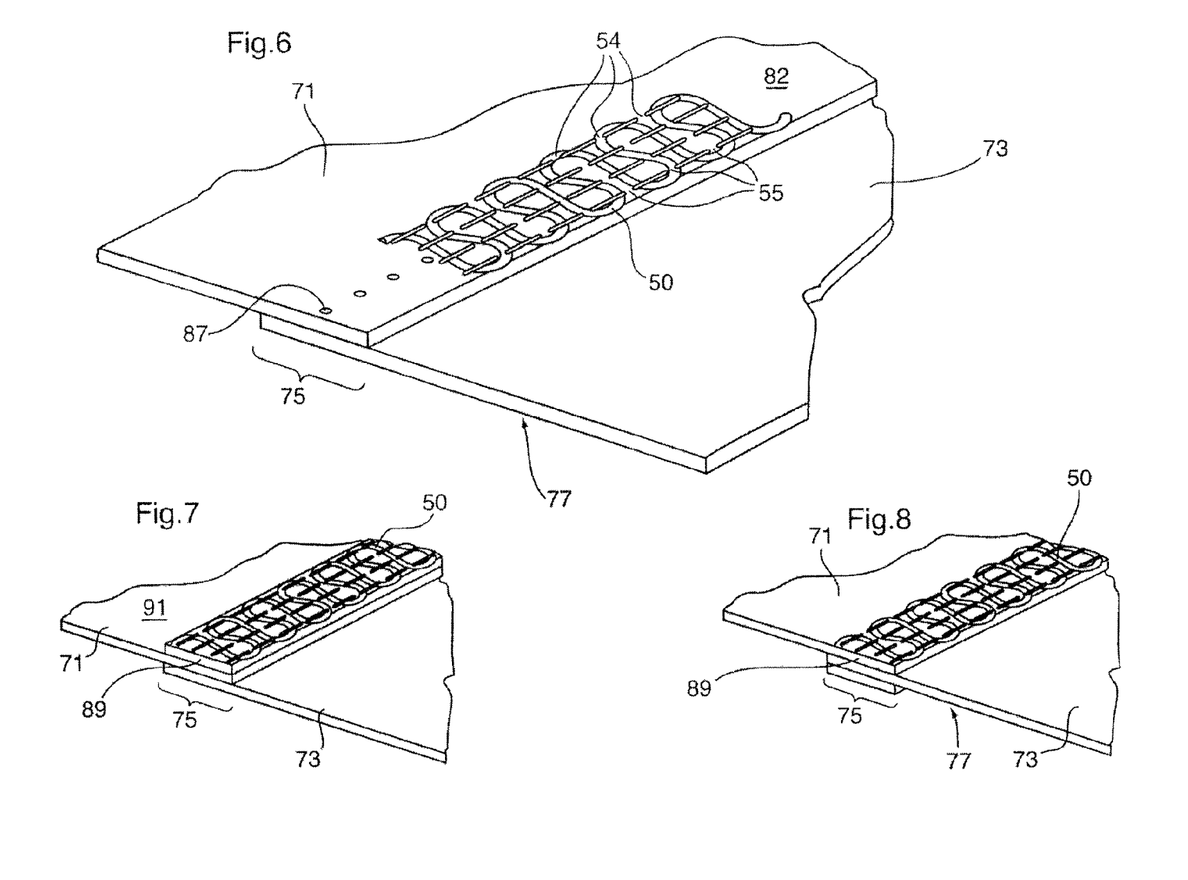
FIG. 6 is a perspective view of the flat seam construction of FIG. 3 arranged on two stitchable materials.
FIG. 7 is a perspective view of a tape integrated onto a top surface of the seam construction of FIG. 6.
FIG. 8 is a perspective view of a tape integrated on a bottom surface of the seam construction of FIG. 6.
Figure 11:
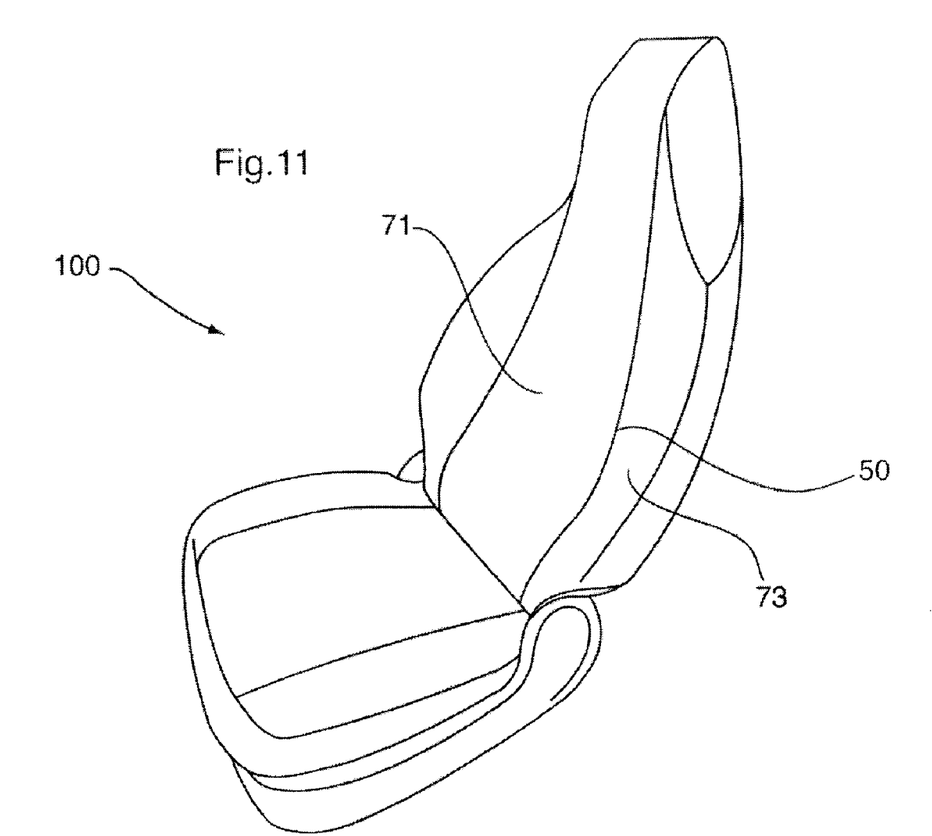
FIG. 11 is a perspective view of an automobile seat having the flat seam construction of FIG. 3 integrated therewith.

Referring now to FIG. 3 of the drawings, there is shown a flat seam construction 50, according to one embodiment of the present invention, which may be formed on a portion of one or more, and preferably two, stitchable automotive upholstery materials 71 and 73 (shown in FIGS. 6 and 11). The flat seam construction 50 is formed at an adjoining portion of two stitchable materials on an automotive seat 100, as shown in FIG. 11. The flat seam construction 50 is generally formed from a number of sequentially formed stitches 52 and 52' as shown. Each successive stitch 52 and 52' may be formed, and applied to the one or more stitchable materials, in any manner known to those skilled in the art. Preferably, each successive stitch 52 and 52' is substantially identical to its preceding stitch, although variations between stitches are contemplated by the present invention. It will be understood that the seam construction 50 as shown in FIG. 3 is shown schematically for ease of illustration and understanding. In practice, the seam 56 and the bottom surface 58 are separated only by the thickness of the material, or materials, upon which the stitch is applied.

FIG. 6 shows a schematic representation of a first stitchable material 71 and a second stitchable material 73 positioned adjacent one another and including a joining region 75, defined by a portion of the first stitchable material 71 overlapping a portion of the second stitchable material 73 whereupon the flat seam construction 50 is formed. It will be apparent to those skilled in the art that forming the flat seam construction 50 upon the joining region 75 results in a substantially flat seam adjoining the two stitchable materials 71 and 73, and obviates the requirement for multiple operations and manipulation of the stitchable materials as required in the prior art. It will be apparent to those skilled in the art that a new and useful arrangement of threads in the flat seam construction 50 as herein disclosed allows for two adjacent materials to be joined only by a joining region 75. Details of the seam construction 50 are herein disclosed, with reference to the illustrated embodiments described below. While reference is made to first and second stitchable materials, it will be apparent to one skilled in the art that the flat seam construction 50 may be applied to any number of stitchable materials, including a single stitchable material.

Referring now to FIG. 3, each stitch 52 (52') comprises two outer threads 60a and 60b, formed into a first outer thread loop 62a and a second outer thread loop 62b, and at least one inner thread 65, formed into at least one inner thread loop 67. According to the embodiment illustrated in FIG. 3, the at least one inner thread 65 comprises two inner threads 65a and 65b, formed into two inner thread loops 67a and 67b. The first outer thread loop 62a and the second outer thread loop 62b are spaced to define a width "W" of the seam construction 50. The two inner thread loops 67a and 67b are positioned between the first and second outer thread loops 62a and 62b. Preferably, the inner thread loops 67a and 67b, and the two outer thread loops 62a and 62b are substantially parallel to each other, and evenly spaced across the width "W" of the seam construction 50.

Each of the inner thread loops 67a and 67b and the outer thread loops 62a and 62b transversely penetrates the one or more stitchable materials (not shown in FIG. 3) on a top surface 56 of the seam construction at respective penetration points 54 and 55 thereof. Each of the inner thread loops 67a and 67b and the outer thread loops 62a and 62b has a respective bight portion 69 engaging a bottommost surface 77 of the joining region 75 of the first and second stitchable materials 71 and 73 (shown in FIG. 6). The bottommost surface 77 is coplanar with the bottom surface 58 of the flat seam construction 50. The respective bight portions 69 define a loop at the bottom surface 58 of the seam construction 50 to engage the bottommost surface 77 (shown in FIG. 6), and are held thereon by at least one looper thread 79.

According to the embodiment illustrated in FIG. 3, the at least one looper thread 79 preferably comprises four looper threads 79a, 79b, 79c, and 79d. Each of the looper threads 79a-79d is arranged to be coplanar with the bottommost surface 77 of the at least one stitchable material 71 and 73 (shown in FIG. 6). Each looper thread 79a-79d passes between the bottommost surface 77 and the respective bight portion 69 of each of at least one of the thread loops 62a, 62b, 67a, 67b to thereby engage the respective bight portion 69 and to secure the respective bight portion 69 to the bottommost surface 77. Described now with reference to a first looper thread 79a, but applicable to each looper thread 79a-79d is the structure and interaction of the looper threads 79 with the respective bight portion 69. Each stitch 52 has a first looper thread 79a extending through the bight portion 69a of the first outer thread loop 62a. Thereafter, the first looper thread 79a extends around the bight portions 69a' and 69b' of a subsequent stitch 52' and extends diagonally back through the bight portion 69a of the stitch 52 as shown in FIG. 3. This looping arrangement repeats itself, as the first looper thread 79a subsequently extends through the bight portion 69a' of the subsequent stitch 52'. As shown in FIG. 3, looper threads 79b, 79c, and 79d extend through the bight portions 69b, 69c, and 69d respectively, and loop around respective bight portions 69 to thereby secure the thread loops 62a, 62b, 67a, and 67b in engaging relationship bottommost surface 58 (shown in FIG. 6).

Arranged on a top surface 56 of the flat seam construction 50 is at least one decorative thread, which comprises a decorative thread 81 in the embodiment illustrated in FIG. 3. The decorative thread 81 is visible on a topmost surface 82 of the joining region 75 of first and second stitchable materials 71 and 73 (see FIG. 6). As shown in FIG. 3, the decorative thread 81 extends laterally across a width "W" of the seam construction 50, and is secured on the topmost surface 82 by looping around at least one of the first and second outer thread loops 62a and 62b at a penetration point 54 thereof. Preferably, the decorative thread 81 loops around the second outer thread loop 62b at the penetration point 54, extends laterally across to loop around the first outer thread loop 62a at a penetration point 55, and extends diagonally to loop around an outer thread loop 62b' of the subsequent stitch 52', as shown in FIG. 3, before repeating the above mentioned arrangement. In this manner, the decorative thread 81 forms a serpentine pattern along the length of the flat seam construction 50. It will be apparent to those skilled in the art that the decorative thread 81 may take any form and be produced to provide a generally aesthetic view to the topmost surface 82 of the joining region 75 (shown in FIG. 6).

Figure 4:
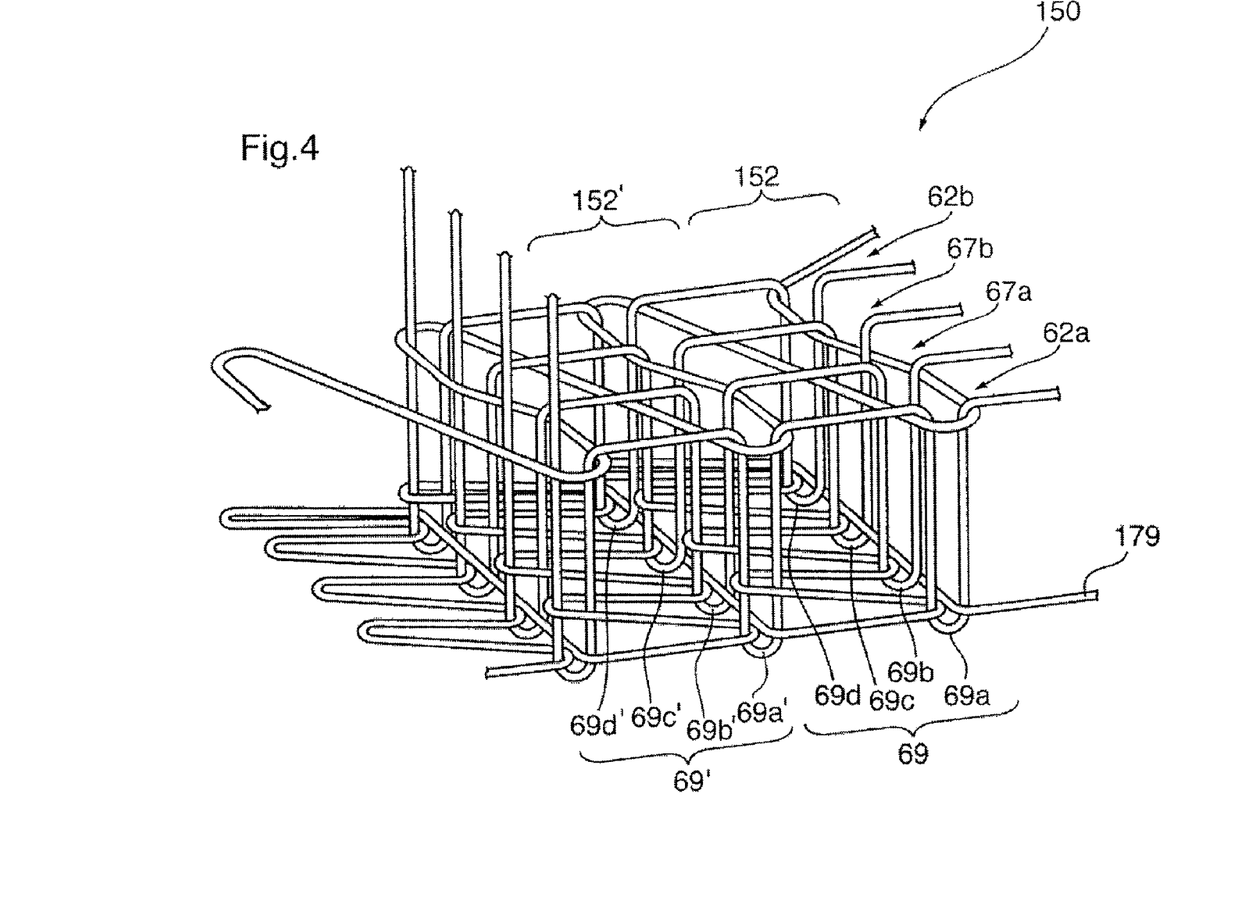
FIG. 4 is a schematic perspective view of a flat seam construction according to a second embodiment of the present invention.

Referring now to FIG. 4, a second embodiment of a flat seam construction 150 is shown having a single looper thread 179. Like elements from the first embodiment shown in FIG. 3 are numbered correspondingly, but are not further described. The looper thread 179 of the second embodiment is arranged to engage the bight portions 69 of each of the inner thread loops 62a and 62b, and the outer thread loops 67a and 67b. Preferably, the looper thread 179 extends laterally through each of the bight portions 69a, 69b, 69c, and 69d of a first stitch 152, extends longitudinally to engage the bight portion 69d' of a subsequent stitch 152' and extends laterally through each of the other bight portions 69c', 69b', and 69a' of the subsequent stitch 152' before extending longitudinally rearwardly to reengage the bight portion 69a of the first outer thread loop 62a as shown in FIG. 4. This defines a closed structure, wherein the looper thread 179 creates a box-like shape between the bight portions 69 of the stitch 152 and the bight portions 69' of the subsequent stitch 152'.

In order to provide additional stability to the flat seam construction 150, the looper thread 179 subsequently extends through the bight portion 69a of the first thread loop 62a and extends longitudinally around the bight portion 69a' of a first thread loop 62a' of the subsequent stitch 52', and extends diagonally rearwards through the bight portion 69b before extending longitudinally around the bight portion 69b', as shown in FIG. 4. This pattern continues, such that the looper thread 179 extends through each of the bight portions 69a to 69d of the thread loops 62a, 67a, 67b, and 62b of the stitch 152 and around each of the bight portions 69a' to 69d' of the respective thread loops of the subsequent stitch 152'. This pattern repeats for each stitch of the seam construction 150.

Figure 5:
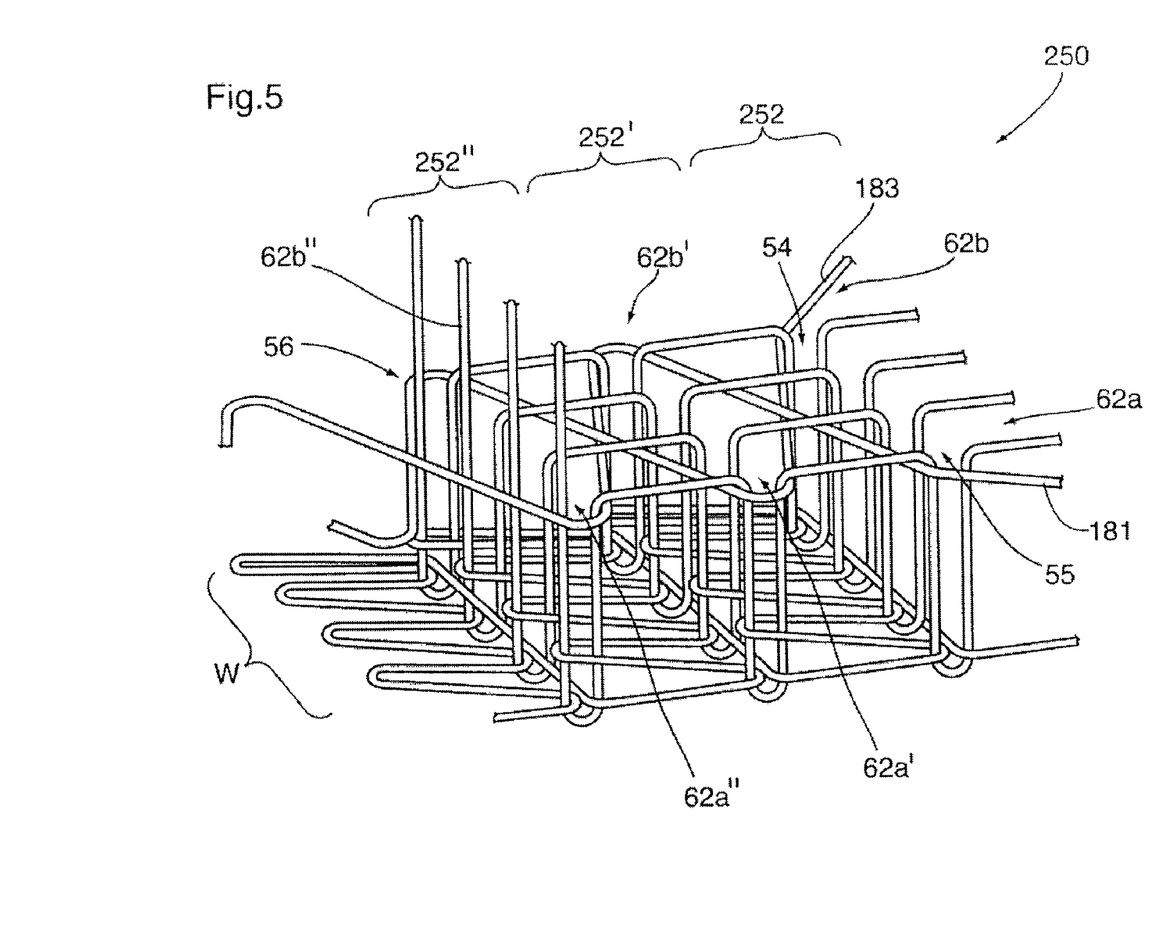
FIG. 5 is a schematic perspective view of a flat seam construction according to a third embodiment of the present invention.

Referring now to FIG. 5, a third embodiment of a flat seam construction 250 is shown to have a first decorative thread 181, and a second decorative thread 183. Like elements from the first embodiment shown in FIG. 3 are numbered correspondingly, but are not further described. The first decorative thread 181 is secured by looping around the first outer thread loop 62a of a stitch 252, at a penetration point 55 thereof. The decorative thread 181 extends diagonally to loop around the second outer thread loop 62b' of the subsequent stitch 252', as shown in FIG. 5, before extending diagonally to loop around a first outer thread loop 62a" of a further stitch 252". The second decorative thread 183 is secured by looping around the second outer thread loop 62b of the stitch 252, at a penetration point 54 thereof. The decorative thread 183 extends diagonally to loop around the first outer thread loop 62a' of the subsequent stitch 252', at a penetration point (not numbered) thereof, before extending diagonally to loop around the second outer thread loop 62b" of a further stitch 252", at a penetration point thereof (not numbered). In this manner, each of the first and second decorative stitches 181 and 183 span the width "4" of the seam construction 250, and extend in a serpentine manner around alternate penetration points of the first and second outer thread loops 62a (or 62a', 62a") and 62b for 62b', 62b") of each successive stitch 252, 252', 252".

The addition of a second decorative thread allows for greater variation in the stitch pattern visible on the top surface 56 of the seam construction 250. Alternatively, the addition of a second decorative thread may be used to include different colours of decorative threads for further aesthetic appeal. It will be apparent to those skilled in the art that any number of decorative threads, and arranged in any manner on the top surface 56 of the seam construction 250 may be used to further enhance the aesthetics of the seam construction 250.

Figure 10:
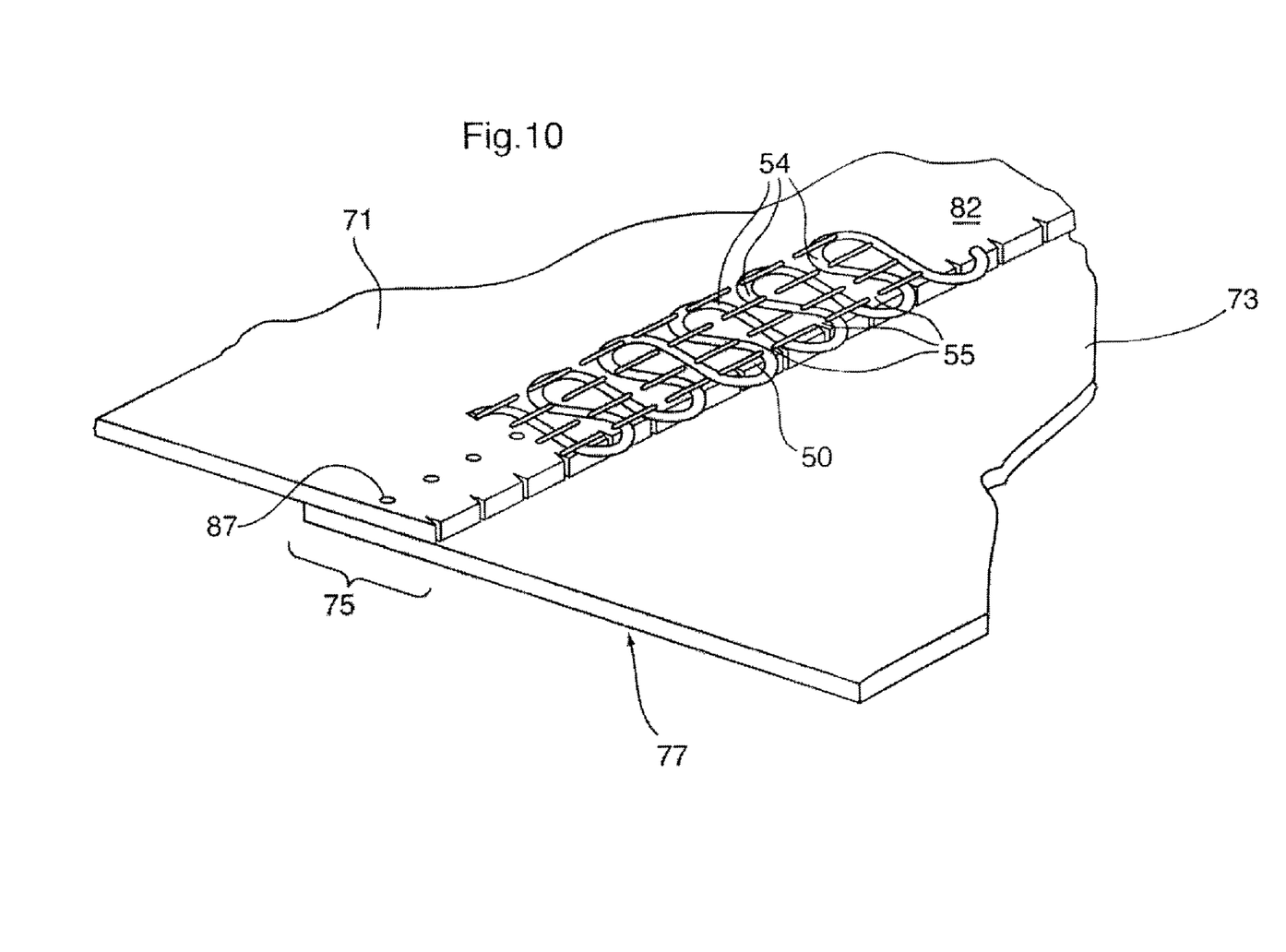
FIG. 10 is a perspective view of the flat seam construction of FIG. 3 in an alternate arrangement on two stitchable materials.

Referring now to FIG. 6, the flat seam construction 50 of FIG. 3 is shown in use in conjunction with a first stitchable material 71 and a second stitchable material 73. It will be understood by those skilled in the art that any of the aforementioned seam constructions 50, 150, and 250, or any others falling within the scope of the present invention, may be applied in the same general manner as described hereinbelow. Pre-formed alignment holes 87 may be provided on the first and second stitchable materials 71 and 73 to ensure the alignment of the materials, but are entirely optional. Alternatively, as shown in FIG. 10, slits 101 may be provided such that the stitch 54 wraps around the edge of the first stitchable material 71.

FIG. 7 shows an optional integrated tape element 89 arranged on a top surface 91 of the first stitchable material 71, and arranged to overlap the joining region 75. The tape element 89 may be used to provide additional aesthetic appeal, or to hide the alignment holes 87. Preferably, the tape element 89 is provided to cover any portion of the bare layer or substrate material which may be visible through the seam construction 50. The substrate material serves as an inner core in automotive seating applications to which the upholstery cover is applied. The tape element 89 may be easily integrated within the flat seam construction 50 by positioning the tape element 89 over the joining region 75 and adapting the seam construction to join the first stitchable material 71, the second stitchable material 73, and the tape element 89. It will be apparent to those skilled in the art that additional layers may also be added, and readily integrated into the seam construction. The tape element 89 may comprises any material capable of being stitched including, but not limited to, polyester, nylon, a ribbon material, or any other fabric. As will be known to those skilled in the art, the tape element 89 may alternatively be provided at any position on a single stitchable material (not shown), that is, for example, at an intermediate position on the single stitchable material (not shown), away from the joining region 75, as described above. This arrangement may be used, for example, to provide a decorative stripe, or ribbon, as needed.

Alternatively, as shown in FIG. 8, the tape element 89 may be integrated onto a bottom surface 77 of the second stitchable material 73, coincident with the joining region 75. The tape element 89 integrated with the upholstery construction on the bottom surface 77 may also be formed on an automotive upholstery application cover, including but not limited to, a vehicle seat cover, a door panel, a console cover, an armrest cover, a sun visor, a headrest cover, and an instrumental panel cover. Moreover, the tape element 89 may comprise one portion of a hook and loop fastener (not shown), to interact with the other portion of the hook and loop fastener (not shown) formed on the substrate material of the automotive upholstery application, and thereby hold the automotive upholstery cover (not shown) in a fixed position on the substrate material. Alternatively, the automotive upholstery cover may simply be glued or attached by conventional means to the substrate material, particularly where it is a plastics, metal, or other hard substrate material conducive to the use of such conventional attachment means. With respect to automotive seats, the tape element 89 integrated with the seam construction 50 on the bottom surface 77 may be formed on an automotive seat cover (not shown) and comprise one portion of a hook and loop fastener (not shown), to interact with the other portion of the hook and loop fastener (not shown) formed on the foam substrate material of an automotive seat, and thereby hold the seat cover (not shown) in a fixed position atop the foam substrate material. Alternatively, the tape element 89 may simply be provided to prevent any foam substrate material, from being visible through, or protruding out from, the seam construction 50.

Figure 9:
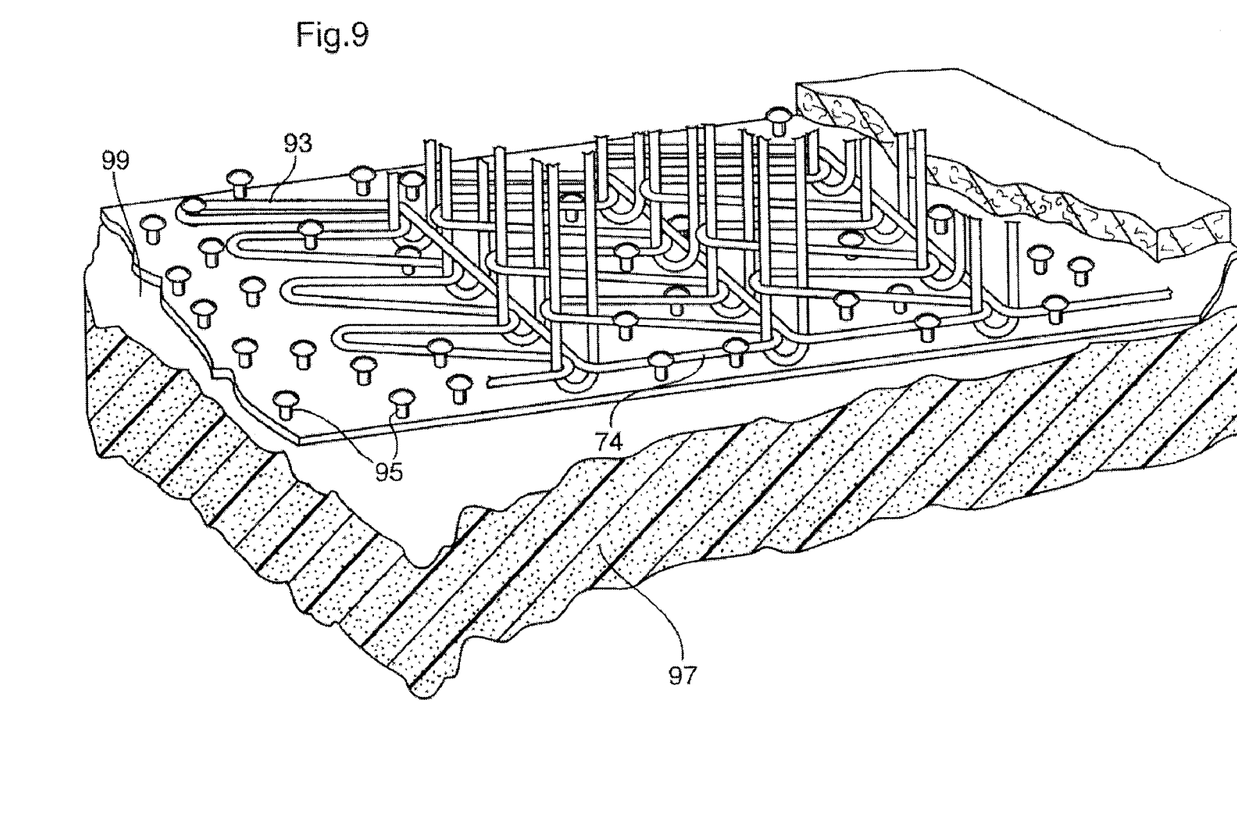
FIG. 9 is a schematic view of the seam construction of FIG. 4 arranged to integrate with tie-down elements on an automotive seat foam material.

In another embodiment shown in FIG. 9, the at least one looper thread 79 has integrated therewith a series of fixing elements, shown as hook portions 93, to interact with a plurality of tie-down stud members 95 formed on, or attached onto, a strip 101 placed on a covered surface 99 of a substrate material 97. As previously mentioned, the substrate material 97 may be a foam material or may be a less flexible material such as metal, plastic, or the like, over which material a cover is applied. The strip 101 may, for example, be a hook portion of a hook and loop fastener positioned in a slot on the substrate, and adapted to interact with the flat seam 50, as described below. The strip 101, may alternatively, be provided in a recessed portion (not shown) of the substrate material 99. The substrate material 99 may be foam or other more dense trim material to which a cover is applied. The tie-down stud members 95 are formed to have lobed ends adapted to engage the hook portions 93. The tie-down stud members 95 may be formed as disclosed in the aforementioned U.S. Pat. No. 6,561,581 issued on May 13, 2003 to Michot et al. The shape, arrangement, and structure of the hook portions 93 may differ from that shown in FIG. 9, but any interaction between the looper thread 79 and the covered surface 99 of the substrate material 97 which acts to restrict movement of the seam construction 50, and materials on which the seam construction 50 is formed, with respect to the substrate material 97, is contemplated by the present invention.

Methods of forming the flat seam construction of the present invention will be apparent to those skilled in the art. Such methods may include adapting known stitching, or seam construction, techniques to produce the seam construction according to the present invention. The flat seam construction of the present invention may be formed in a single operation, and performed by overlapping two adjacent materials and applying the seam construction thereon. Where integrated elements are introduced, such as the tape elements described above, these act as a third material position atop the two adjacent materials. As such, additional layers of materials, or elements integrated within the seam construction can easily be formed without the need to manipulate the orientation of the materials, or introduce additional steps in the stitching process.

The flat seam construction of the present invention also produces less waste material than those disclosed in the prior art, when used to join two stitchable materials. The arrangement of two adjacent, stitchable materials having only a joining portion, effectively the width of the seam construction, therebetween allows for only a small portion of the stitchable materials to be used in joining the two stitchable materials.

Preferably, the threads used in the seam construction as hereinabove described are of the constructed from materials typically employed in automotive seam construction. These may be nylon or polyester, or any other material as would be known to those skilled in the art. The threads, and seam construction, preferably conform to those material standards as required in automotive seam construction, for example, but not limited to, ISO 17028, ISO 105-A03, ISO 105-X12, ISO 11014-1, SAE J361, SAE J1885, SAE J1960 and 089000. The threads may be any desired thickness in conformance with the aforementioned specifications, or any other thickness as required for use with, for example, but not limited to, automotive seat covers, or other automotive, or transportation, related applications where the strength, durability, and ease of manufacture of the seam construction as herein disclosed may be applied. Furthermore, the threads may optionally be provided in a variety of colors, or otherwise coated for wear resistance, abrasion resistance, strength, aesthetics, or any other coating applications as would be known to those skilled in the art.

While the seam construction of the present invention has been described with regards to automotive upholstery covers, it is contemplated that the seam construction may be used for decorating or joining other elements within automobiles, or other transportation systems, where strong, resilient flat seam construction is needed and can be advantageously applied in a single step process. For example, in order to provide generally flat surfaces on airbag arrangements, the flat seam construction of the present invention may be used.

Other modifications and alterations may be used in the design and manufacture of other embodiments according to the present invention without departing from the spirit and scope of the invention, which is limited only by the accompanying claims. For example, other arrangements and structures of the thread loops, decorative threads, looper threads may be used in accordance with the teachings of the present invention. For example, the seam construction may comprise two outer thread loops, and an inner thread to thereby define a seam construction capable of being formed with three needle threads. Additional looper, or decorative, threads maybe be arranged in any manner consistent with the claims, and are not restricted to the particular arrangements described above. Furthermore, other elements may be integrated into the seam construction may be necessary for a particular application.

Other modifications and alterations may be used in the design and manufacture of other embodiments according to the present invention without departing from the spirit and scope of the invention, which is limited only by the accompanying claims. For example, other arrangements and structures of the thread loops, decorative threads, looper threads may be used in accordance with the teachings of the present invention. For example, the seam construction may comprise two outer thread loops, and an inner thread to thereby define a seam construction capable of being formed with three needle threads. Additional looper, or decorative, threads maybe be arranged in any manner consistent with the claims, and are not restricted to the particular arrangements described above. Furthermore, other elements may be integrated into the seam construction may be necessary for a particular application.

We claim:

1. A flat seam construction formed on overlapping portions of stitchable automotive upholstery materials each comprising a first soft relatively thin material and a second substrate material that is less flexible than the first relatively thin material, said seam construction having a number of sequentially formed stitches, each stitch comprising:

i. two outer threads, formed into first and second outer thread loops, and two inner threads, formed into first and second inner thread loops;

ii. said first and second outer thread loops spaced across a width of said seam construction, and said first and second inner thread loops positioned between said first and second outer thread loops;
iii. each of said inner and outer thread loops transversely penetrating said one or more stitchable materials; each of said inner and outer thread loops having a bight portion engaging a bottom surface of said one or more stitchable materials;
iv. at least one looper thread formed on, and coplanar with said bottom surface, and arranged such that, said at least one looper thread passes between said bottom surface and at least one of said bight portions;
v. at least one decorative thread visible on a top surface of said portion of one or more stitchable materials and extends across said width; wherein said at least one decorative thread loops around at least said first outer thread loop at a penetration point thereof.

2. A flat seam construction according to claim 1, wherein the overlapping portions of stitchable materials define a joining region for receiving said number of sequentially formed stitches to join the stitchable materials.

3. A flat seam construction according to claim 2, wherein said sequentially formed stitches extend along a length of said joining region, said at least one decorative thread is arranged in a serpentine pattern along said length of said joining region, and said at least one looper thread extends along said length in a path such that said at least one looper thread passes between said bottom surface and each of said bight portions.

4. A flat seam construction according to claim 2, further comprising at least one decorative element positioned on said joining region and secured thereto by said sequentially formed stitches.

5. A flat seam construction according to claim 1, wherein said decorative thread loops around said first outer loop at said penetration point thereof, extends laterally across said width and loops around said second outer loop at a second penetration point thereof.

6. A flat seam construction according to claim 5, wherein said decorative thread extends diagonally from said second outer loop at said second penetration point thereof to loop around a subsequent first outer loop of a subsequent stitch, extends laterally across said width and loops around a subsequent second outer loop of a subsequent stitch, thereby forming a serpentine pattern along a length of said flat seam construction.

7. A flat seam construction according to claim 1, wherein the stitchable materials are covering materials for at least one of automotive door panels, automotive consoles, automotive armrests, automotive sun visors, automotive headrests, and automotive instrument panels.

8. A flat seam construction according to claim 1, wherein said at least one looper thread comprises four looper threads, each passing through said bight portion of a respective one of said inner and outer thread loops.

9. A flat seam construction according to claim 1, wherein said at least one decorative thread comprises first and second decorative threads, wherein said first decorative thread loops around said first outer loop at said penetration point thereof, and extends diagonally to loop around a second outer loop of a subsequent stitch at a penetration point thereof; and said second decorative thread loops around said second outer loop at a penetration point thereof, and extends diagonally to loop around a first outer loop of a subsequent stitch at a penetration point thereof.

10. A flat seam construction according to claim 1, wherein said inner and outer threads are substantially evenly spaced across said width and substantially parallel to each other.

11. A flat seam construction formed on a portion of one or more stitchable automotive upholstery materials said seam construction having a number of sequentially formed stitches, each stitch comprising:
i. two outer threads, formed into first and second outer thread loops, and at least one inner thread, formed into at least one inner thread loop;
ii. said first and second outer thread loops spaced across a width of said seam construction, and said at least one inner thread loop positioned between said first and second outer thread loops;
iii. each of said inner and outer thread loops transversely penetrating said one or more stitchable materials; each of said inner and outer thread loops having a bight portion engaging a bottom surface of said one or more stitchable materials;
iv. at least one looper thread formed on, and coplanar with said bottom surface, and arranged such that, said at least one looper thread passes between said bottom surface and at least one of said bight portions;
v. at least one decorative thread visible on a top surface of said portion of one or more stitchable materials and extends across said width; wherein said at least one decorative thread loops around at least said first outer thread loop at a penetration point thereof; and
wherein said at least one looper thread comprises four looper threads, each passing through said bight portion of a respective one of said inner and outer thread loops.

12. A flat seam construction formed on a portion of one or more stitchable automotive upholstery materials, said seam construction having a number of sequentially formed stitches, each stitch comprising:
i. two outer threads, formed into first and second outer thread loops, and at least one inner thread, formed into at least one inner thread loop;
ii. said first and second outer thread loops spaced across a width of said seam construction, and said at least one inner thread loop positioned between said first and second outer thread loops;
iii. each of said inner and outer thread loops transversely penetrating said one or more stitchable materials; each of said inner and outer thread loops having a bight portion engaging a bottom surface of said one or more stitchable materials;
iv. at least one looper thread formed on, and coplanar with said bottom surface, and arranged such that, said at least one looper thread passes between said bottom surface and at least one of said bight portions;
v. at least one decorative thread visible on a top surface of said portion of one or more stitchable materials and extends across said width; wherein said at least one decorative thread loops around at least said first outer thread loop at a penetration point thereof; and
wherein said at least one decorative thread comprises first and second decorative threads, wherein said first decorative thread loops around said first outer loop at said penetration point thereof, and extends diagonally to loop around a second outer loop of a subsequent stitch at a penetration point thereof; and said second decorative thread loops around said second outer loop at a penetration point thereof, and extends diagonally to loop around a first outer loop of a subsequent stitch at a penetration point thereof.

13. A flat seam construction formed on a portion of one or more stitchable automotive upholstery materials said seam construction having a number of sequentially formed stitches, each stitch comprising:
   i. two outer threads, formed into first and second outer thread loops, and at least one inner thread, formed into at least one inner thread loop;
   ii. said first and second outer thread loops spaced across a width of said seam construction, and said at least one inner thread loop positioned between said first and second outer thread loops;
   iii. each of said inner and outer thread loops transversely penetrating said one or more stitchable materials; each of said inner and outer thread loops having a bight portion engaging a bottom surface of said one or more stitchable materials;
   iv. at least one looper thread formed on, and coplanar with said bottom surface, and arranged such that, said at least one looper thread passes between said bottom surface and at least one of said bight portions;
   v. at least one decorative thread visible on a top surface of said portion of one or more stitchable materials and extends across said width; wherein said at least one decorative thread loops around at least said first outer thread loop at a penetration point thereof; and
   further comprising at least one decorative element positioned on said joining region and secured thereto by said sequentially formed stitches.

14. A flat seam construction according to claim 13, wherein said decorative element is at least one of a tape and a ribbon.

15. A flat seam construction according to claim 14, wherein said decorative element is positioned on a top surface of said joining region.

16. A flat seam construction according to claim 14, wherein said decorative element is positioned on a top surface of said joining region.

17. A flat seam construction according to claim 13, wherein said decorative element is at least one of a tape and a ribbon.

18. A flat seam construction formed on a portion of one or more stitchable automotive upholstery materials, said seam construction having a number of sequentially formed stitches, each stitch comprising:
   i. two outer threads, formed into first and second outer thread loops, and at least one inner thread, formed into at least one inner thread loop;
   ii. said first and second outer thread loops spaced across a width of said seam construction, and said at least one inner thread loop positioned between said first and second outer thread loops;
   iii. each of said inner and outer thread loops transversely penetrating said one or more stitchable materials; each of said inner and outer thread loops having a bight portion engaging a bottom surface of said one or more stitchable materials;
   iv. at least one looper thread formed on, and coplanar with said bottom surface, and arranged such that, said at least one looper thread passes between said bottom surface and at least one of said bight portions;
   v. at least one decorative thread visible on a top surface of said portion of one or more stitchable materials and extends across said width; wherein said at least one decorative thread loops around at least said first outer thread loop at a penetration point thereof; and
   further comprising one or more fixing elements positioned on a bottom surface of said one or more stitchable materials, and adapted to interact with a substrate material covered by said one or more covering materials, and secured thereto by said sequentially formed stitches.

19. A flat seam construction according to claim 18, wherein said one or more fixing elements is selected from the group comprising one or more tie-downs, the hook portion of a hook and loop fastener, and the loop portion of a hook and loop fastener.

20. A flat seam construction according to claim 18, wherein said one or more fixing elements comprises a hook element formed integrally with said one or more looper threads, said hook element arranged to engage a tie-down stud element extending from said substrate material.

21. A flat seam construction formed on a portion of one or more stitchable automotive upholstery materials, said seam construction having a number of sequentially formed stitches, each stitch comprising:
   i. two outer threads, formed into first and second outer thread loops, and at least one inner thread, formed into at least one inner thread loop;
   ii. said first and second outer thread loops spaced across a width of said seam construction, and said at least one inner thread loop positioned between said first and second outer thread loops;
   iii. each of said inner and outer thread loops transversely penetrating said one or more stitchable materials; each of said inner and outer thread loops having a bight portion engaging a bottom surface of said one or more stitchable materials;
   iv. at least one looper thread formed on, and coplanar with said bottom surface, and arranged such that, said at least one looper thread passes between said bottom surface and at least one of said bight portions;
   v. at least one decorative thread visible on a top surface of said portion of one or more stitchable materials and extends across said width; wherein said at least one decorative thread loops around at least said first outer thread loop at a penetration point thereof; and
   wherein said inner and outer threads are substantially evenly spaced across said width and substantially parallel to each other.

* * * * *